United States Patent [19]

Mitchell et al.

[11] 4,063,570

[45] Dec. 20, 1977

[54] BACKFLOW CHECK VALVE

[76] Inventors: H. Charles Mitchell, 7525 Oakhill Ave., Wauwatosa, Wis. 53213; Donald G. Fettes, 66 Rawlinson Place, Regina, Saskatchewan, Canada

[21] Appl. No.: 715,773

[22] Filed: Aug. 19, 1976

[51] Int. Cl.² ............................................. F16K 15/03
[52] U.S. Cl. .............................. 137/454.2; 137/527.8
[58] Field of Search .................. 137/527, 527.2, 527.8, 137/855, 856, 858, 454.2

[56] References Cited

U.S. PATENT DOCUMENTS

| 200,093 | 2/1878 | Sargent | 137/527.8 |
| 2,664,264 | 12/1953 | Fennema | 137/454.2 X |
| 3,128,785 | 4/1964 | Krummel | 137/527 X |
| 3,152,608 | 10/1964 | Morrison et al. | 137/527 X |
| 3,814,124 | 6/1974 | Bell | 137/454.2 X |
| 4,009,366 | 2/1977 | Danell | 137/856 X |

FOREIGN PATENT DOCUMENTS 16,159 of 1911 United Kingdom ................. 137/858

*Primary Examiner*—William R. Cline
*Attorney, Agent, or Firm*—Wheeler, Morsell, House & Fuller

[57] ABSTRACT

A flap valve, designed to be installed and maintained in the standard cleanout wye of a conventional plastic plumbing system through the side channel thereof without removing said wye from service, comprising a flap with a flexible sealing gasket and a rigid backing plate, a valve seat with an O-ring seal and a locking tooth, which seat seals to the upstream channel of said wye when pressed into said channel, a hinge formed by attaching an extension of said sealing gasket to a curved downstream edge of said valve seat with a hinge clamp so that the extension of the sealing gasket will bend around said curved downstream edge, and a stop to prevent said flap from opening too widely, said stop being an extension of said hinge clamp.

10 Claims, 4 Drawing Figures

U.S. Patent  Dec. 20, 1977  4,063,570
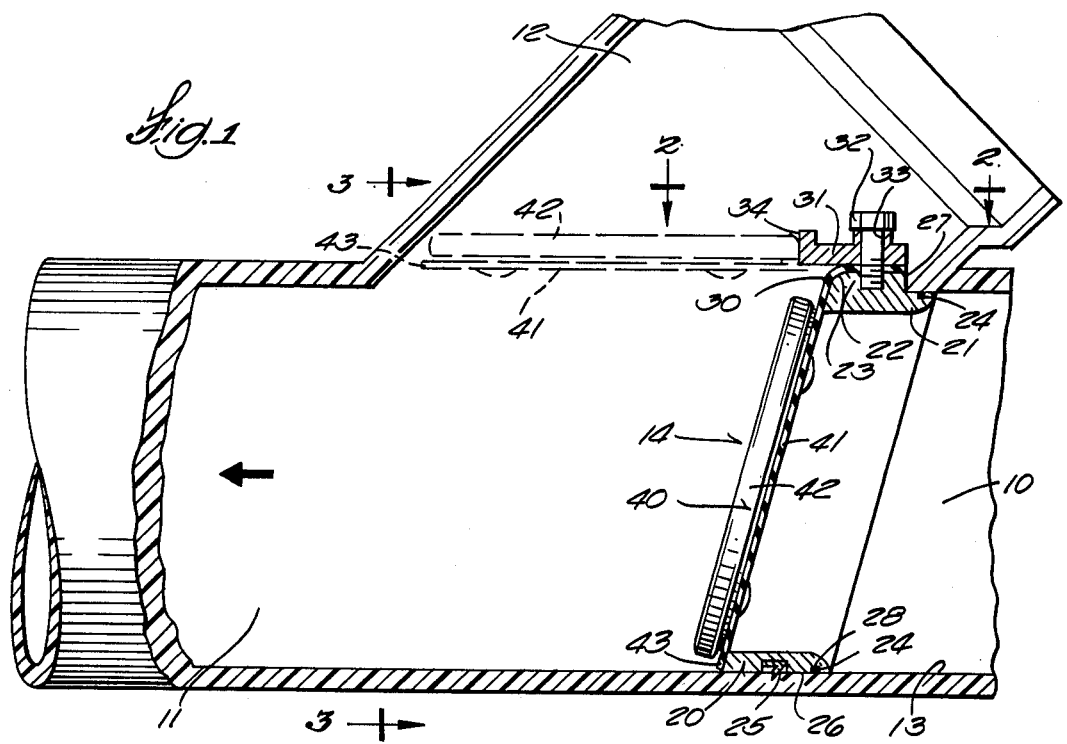
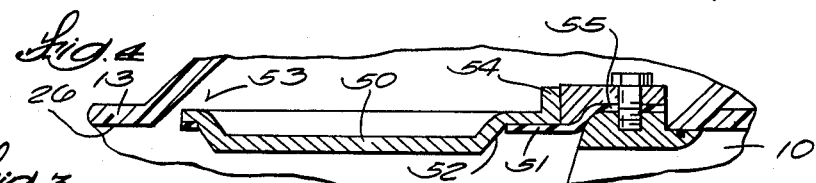
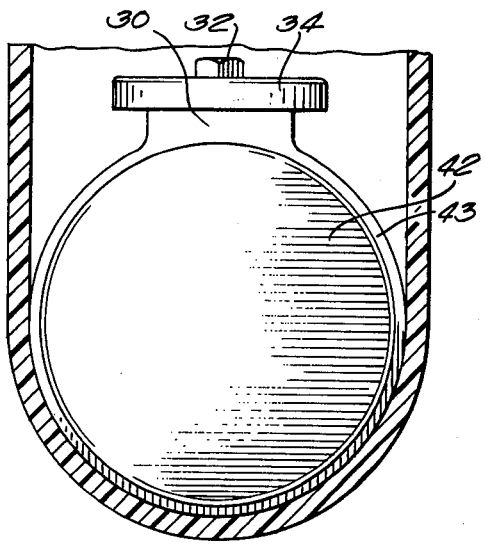
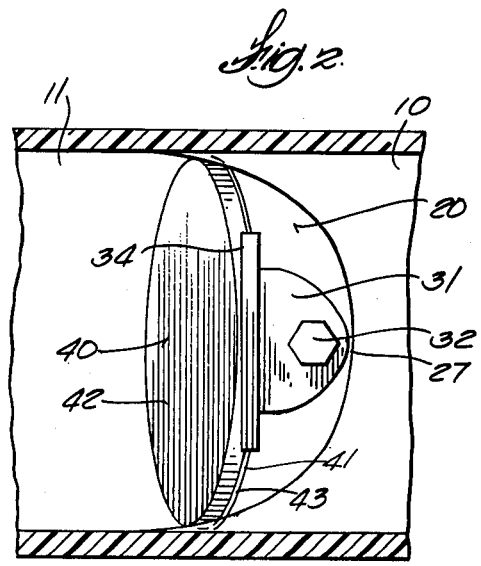

BACKFLOW CHECK VALVE

SUMMARY OF THE INVENTION

Backflow check valves are designed for installation in a sewer pipe to allow sewage to pass downstream through the pipe while preventing water and sewer gases from traveling upstream. While backflow check valves have been well known in the art since before 1900 (see in particular Chappeli, U.S. Pat. No. 314,107), several features of the present invention represent advances over the prior art in this field.

Unlike any of the known prior art, the present assembly may be installed in a conventional plastic cleanout wye which is already in service, through the cleanout channel. Cleanout wyes and cleanout tees are defined as equivalent structures for the purposes of this application. Known prior art includes valves with removable flaps or valve seats for service access, but in many cases the plumbing must be disassembled to remove or replace the valve, and in all known cases the plumbing which contains the valve must be specially designed for that purpose. Thus none of the known prior art discloses a valve which can be added to existing drain systems without modifying the plumbing considerably.

In contrast to the prior art, installation of this device is simple. The valve assembly is inserted through the cleanout channel of an existing cleanout wye and forced upstream slightly. A tooth protruding from the seat digs into the pipe wall to prevent further movement, and an O-ring seals the seat to the inside of the pipe. Access to the unit for repair and replacement of worn-out parts is available through the cleanout channel, and the cleanout channel is still open to allow service to the downstream areas of the sewer.

Second, while some flap valves disclosed in the references use an extension of a flexible sealing gasket as a flexible hinge member, the present device is the only known embodiment in which the flexible hinge bends over a curved shoulder. The advantage of this structure is that kinking of the hinge is prevented, and hinge life is greatly lengthened as a result.

Finally, none of the references provide for an extension of a hinge clamp to act as a stop for the flap and simultaneously protect the flexible hinge from possible damage when tools such as a plumber's snake are inserted into the cleanout channel to service downstream portions of the pipe.

DRAWINGS

FIG. 1 is a vertical longitudinal cross sectional view of a conventional wye equipped with my improved backflow valve, showing the valve flap in closed position in full lines and in open position in broken lines;

FIG. 2 is a view of my improved backflow valve taken on line 2—2 of FIG. 1; and

FIG. 3 is a cross-sectional view taken along line 3—3 in FIG. 1

FIG. 4 is a fragmentary view like FIG. 1 but showing an alternate embodiment of the invention, in which a rigid plate directly backs an annular seal.

DESCRIPTION AND SPECIFICATION

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

FIG. 1 depicts a conventional plastic cleanout wye, having an upstream channel 10, a downstream channel 11, and a cleanout channel 12, in which an improved backflow valve 14 has been installed. An arrow in the upstream channel indicates the normal direction of flow for sewage; backflow check valves such as the one here are designed to allow normal flow of sewage, while preventing material from flowing in the reverse direction.

Seat 20 of the backflow valve has an exterior tubular face 26 with an upstream portion 21 which fits against inside tubular face 13 of upstream channel 10, and a downstream portion 22 which protrudes to allow access to its upper side from cleanout channel 12. Upstream portion 21 is sealed to inside tubular face 13 by O-ring 24 lying in groove 28, and tooth 25 protrudes from upstream portion 21 into tubular face 13 to lock valve seat 20 in place. Downstream portion 22 has an upstream shoulder 27 which prevents valve seat 20 from traveling upstream, even when back pressure is great.

Valve flap 40 consists of a flexible gasket 41 attached to a rigid backing plate 42 to strengthen the central part of the flexible gasket. Edge 43 of the flexible gasket extends beyond rigid plate 42 on all sides to form a skirt which can deform around solid objects blocking the travel of valve flap 40 into sealing engagement with seat 20. This deformation allows valve flap 40 to bypasss some solid objects, and it allows partial sealing of the valve even where an object is held against the sealing edge of valve seat 20.

Flexible hinge 30 is an extension of flexible gasket 41. Hinge 30 is held against curved shoulder 23 by hinge clamping means 31, secured by advancement of screw 32 into threaded hole 33. Downstream extension 34 of hinge clamping means 31 abuts the top edge of rigid plate 42 when the valve is fully open to prevent the valve flap from swinging so far open that flexible edge 43 lodges against the wall of cleanout channel 12, which could result in the valve sticking open. Downstream extension 34 also protects hinge 30 from damage when tools are inserted through cleanout channel 12 to clean out the portion of the pipe downstream from the cleanout wye. Curved shoulder 23 supports flexible hinge 30 and guides its curvature to prevent kinking of hinge 30, thus extending its useful life.

FIG. 4 depicts a valve flap which may be substituted for the flap in FIG. 1 in applications where great back pressure is expected. In this embodiment rigid backing plate 50 is in face contact with gasket 51 against valve seat 20 so that annular sealing gasket 51 will be pressed between seat 20 and backing plate 50 by back pressure. This prevents gasket 51 from deforming backward through valve saat 20 and allowing fluid to seep through the valve. In this embodiment a tapered, preferably frusto-conical centering projecting segment 52 of backing plate 50 acts to center the flap so that it seats properly when the valve closes. Increased back pressure merely increases the sealing force and tends to prevent solids from interfering with sealing.

To install backflow check valve 14 in a cleanout wye, the entire valve assembly is inserted through cleanout channel 12 and forced upstream so that O-ring 24 and tooth 25 each engage with inside tubular face 13 of upstream channel 10.

The parts of the valve assembly can be inspected, removed, or replaced by loosening screw 32 to release hinge clamping means 31, and then removing the entire valve flap.

We claim:

1. A backflow valve comprising a valve seat, a valve flap, and a flexible hinge, and adapted to be installed and maintained in an unmodified conventional cleanout wye through the side channel thereof without removing said wye from service, wherein the valve seat has an exterior tubular wall with upstream and downstream portions sized for insertion through the cleanout channel, said upstream portion has a diameter slightly less than that of the inside tubular edge of the upstream edge of said wye, and said upstream portion has attachment and sealing means to secure said valve seat to said inside tubular face of the upstream channel of the cleanout wye by inserting the valve seat through the cleanout channel of said wye and forcing the valve seat upstream a short distance, thus engaging said sealing means between the upstream edge of the exterior tubular face of the valve seat and the inside tubular face of the upstream channel of the cleanout wye, said attachment means consisting of at least one tooth which protrudes from the upstream portion of only the exterior tubular wall of the valve seat and which lodges against the interior tubular face of the upstream channel of the cleanout wye when the valve seat is installed therein to prevent movement of the valve seat with respect to the cleanout wye after said valve seat is installed, said sealing means consisting of an O-ring which seats between the upstream portion of the exterior tubular wall of the valve seat and the inside tubular wall of the upstream channel of said cleanout wye, whereby said valve may be installed without adhesives or other external securing means, said hinge being backed by a shoulder curved on a large radius.

2. The device of claim 1, in which said valve flap consists of a flexible sealing gasket with upstream and downstream faces, said upstream face sealing against the valve seat, and a rigid backing place of smaller diameter than the downstream face of the gasket is mounted to said downstream face in concentric alignment thereto, whereby the portion of the flexible gasket lying outside the edge of the backing plate can deform around solid obstructions to reach the valve seat when back pressure tends to force the valve shut.

3. The device of claim 2 in which said flexible hinge consists of an extension of said flexible gasket which is attached by clamping means to the downstream portion of the exterior tubular face of the valve seat.

4. The device of claim 3 in which said clamping means consist of a threaded hole in the downstream portion of the exterior tubular face of the valve seat, a clamping member with a hole in axial alignment with said threaded hole, and a screw which passes through the hole in the clamping member, then through the flexible hinge, then into the threaded hole in threaded engagement, such clamping means being accessible through the cleanout channel of the wye to facilitate removal and replacement of the valve flap and hinge.

5. The device of claim 4, in which said clamping member has a downstream extension which abuts against the backing plate of the valve flap when such flap is fully opened, whereby damage due to excess travel of said flap is prevented and whereby said flexible hinge is protected from damage caused by tools inserted through the cleanout channel to service areas of the plumbing system downstream from the cleanout wye.

6. The device of claim 1, in which said valve flap consists of a rigid plate with upstream and downstream faces, said upstream face having a centering projection with angled sides and an outer annular edge which backs an annual sealing element to give it rigidity, thus preventing leakage past said flap when the valve is closed.

7. The device of claim 6 in which said flexible hinge consists of an extension of said annular sealing surface attached by clamping means to the downstream portion of the exterior tubular face of the valve seat, and said centering projection is frusto-conical.

8. The device of claim 7 in which said clamping means consist of a threaded hole in the downstream portion of the exterior tubular face of the valve seat, a clamping member with a hole in axial alignment with said threaded hole, and a screw which passes through the hole in the clamping member, then through the flexible hinge, then into the threaded hole in threaded engagement, such clamping means being accessible through the cleanout channel of the wye to facilitate removal and replacement of the valve flap and hinge.

9. The device of claim 8, in which said clamping member has a downstream extension which abuts against the backing plate of the valve flap when such flap is fully opened, whereby damage due to excess travel of said flap is prevented and whereby said flexible hinge is protected from damage caused by tools inserted through the cleanout channel to service areas of the plumbing system downstream from the cleanout wye.

10. The device of claim 9, in which the downstream portion of the exterior tubular face of the valve seat has a shoulder with a relatively large radius of curvature underlying the flexible hinge whereby kinking of the flexible hinge is prevented.

* * * * *